UNITED STATES PATENT OFFICE.

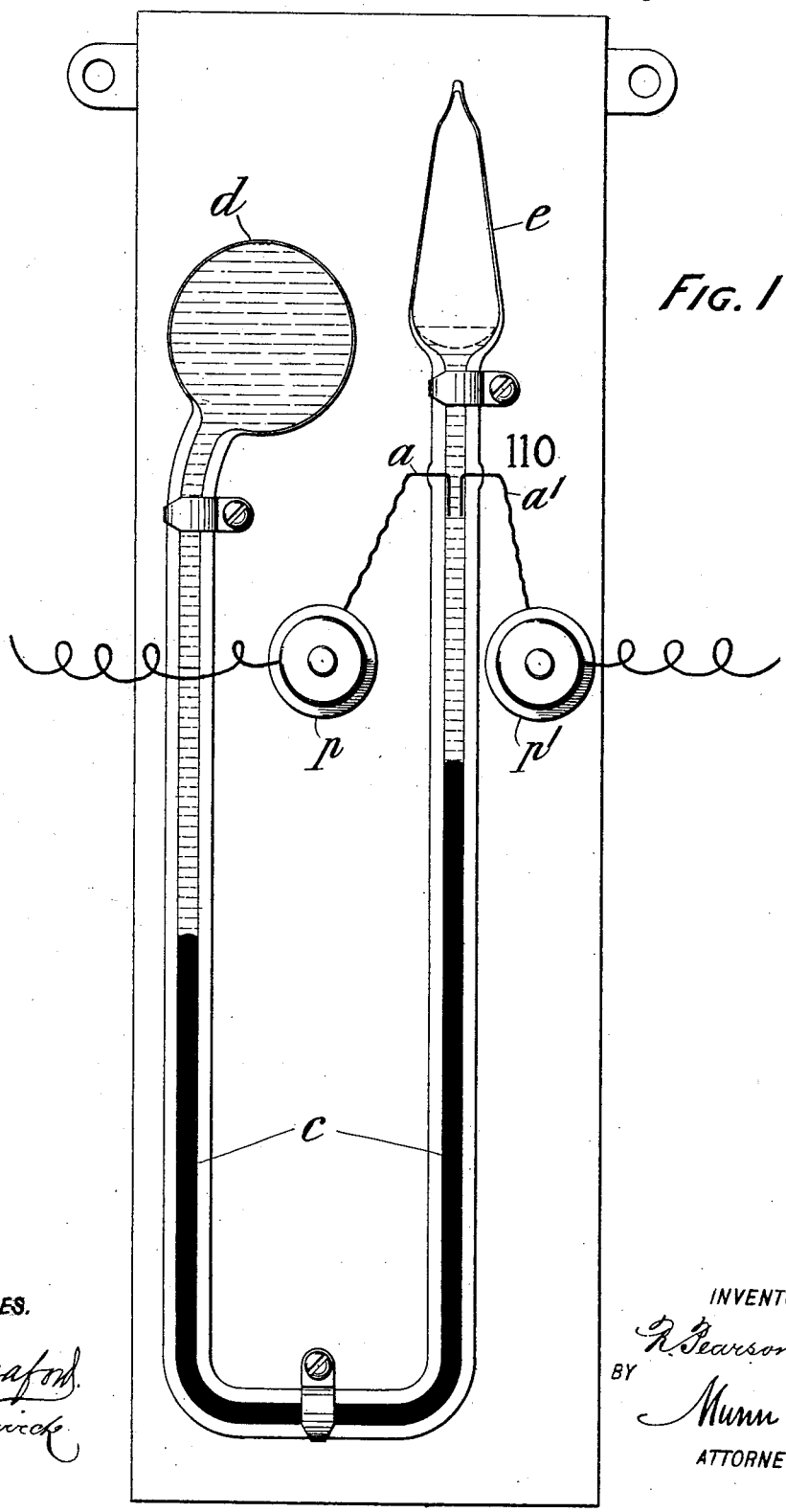

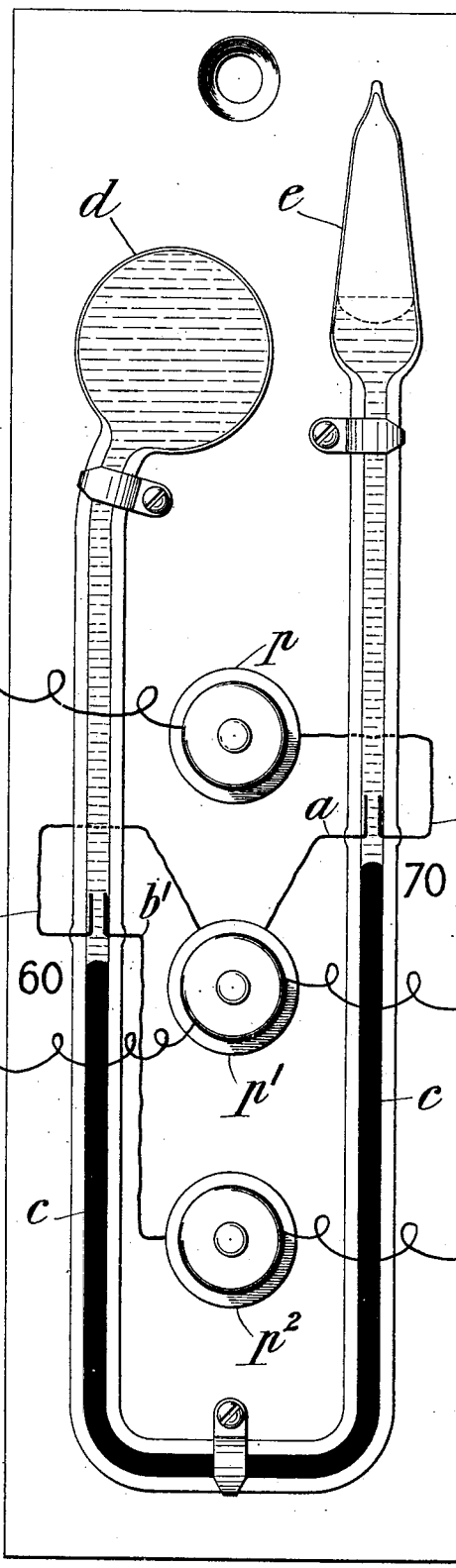

RICHARD PEARSON, OF LONDON, ENGLAND.

THERMOMETRIC CIRCUIT-CLOSER OR ALARM.

SPECIFICATION forming part of Letters Patent No. 560,921, dated May 26, 1896.

Application filed September 3, 1895. Serial No. 561,383. (No model.)

*To all whom it may concern:*

Be it known that I, RICHARD PEARSON, engineer, of 2 Great St. Helens, in the city of London, England, have invented new and useful Improvements in Thermometric Circuit-Closers or Alarms, of which the following is a full, clear, and exact description.

My invention relates to thermometric electric-circuit closers of that kind in which the closure is effected by the contact of the mercurial column with platinum contact-wires, one of which has always hitherto been in constant contact with the mercury while the other wire entered the bore of the thermometer at or extended therein to a point not reached by the mercurial column at normal temperatures. The objection to this arrangement is that the platinum wires become rapidly destroyed, the one in constant contact with the mercury becoming amalgamated and dissolved and the other when contained in a dry tube, whether closed or open, becoming covered with oxid of mercury, resulting from oxidation of the vapors or fumes given off from the mercurial column by the oxygen of the air or residual air contained in the thermometer-tube.

According to my improvement both of the platinum contact-wires forming the terminals of the alarm-circuit enter the thermometer-tube at such a point or points that neither wire shall normally be in contact with the mercury, and there is interposed between the mercury column and the said wires or contacts a short column of an insulating fluid which will prevent the emanation of fumes or vapors into the tube, the fluid being of the composition hereinafter described and claimed and of such a nature as to act as a lubricant for the bore and contacts and avoid liability of the mercury column breaking when the temperature falls again after being raised. In this insulating-column the ends of the platinum wires may be constantly bathed.

The thermometer may be of the ordinary straight form and the mercury column may itself be the thermometric fluid if it be required to close the circuit only on the rise of temperature to a given point, as in the case of a fire-alarm; or the mercury column may be merely propelled by the expansion of another fluid acting as the thermometric fluid, the mercury being in that case used only for the purpose of closing the electric circuit or circuits, as in some maximum and minimum thermometers, in which case the contacts may be duplicated, so that a circuit will be closed on the attainment of either of two limits of temperature, as required for horticultural, medical, and other purposes.

Reference is to be had to the accompanying drawings, forming part of this specification, which show, on a scale about twice full size, in Figure 1, a fire-alarm whereby the alarm will be given on the attainment of an abnormally high temperature, and in Fig. 2 a thermometric alarm whereby the alarm will be given on a rise or fall of temperature beyond predetermined limits.

In both cases the thermometer is shown as of U shape and is provided with a pair of contacts $a$ $a'$, formed of platinum wires, sealed through the glass of the thermometer-stem and entering the bore at a point or points not reached by the mercurial column $c$ at normal temperatures, but only when it is moved along the bore by the expansion under an excessive temperature of the thermometric fluid contained in the bulb $d$. The part of the bore where the contacts $a$ $a'$ are situated is occupied at normal temperatures by an insulating liquid, being creosote, prepared as hereinafter described, or other heavy hydrocarbon, which acts as a lubricant and preserves the contact-wires from attack by emanations from the mercury, the space within the small bulb $e$ being the usual vacuum.

The contacts $a$ $a'$ may be directly opposite each other, as shown, or not, and they are formed preferably by bending back the ends of the platinum wires, so that they lie along the interior of the bore for a short distance. They are connected to the binding-posts $p$ $p'$ and form the terminals of an electric circuit including a bell or other alarm or indicator. The lubrication of the contacts is important, as it avoids liability of a globule of mercury breaking off from the end of the column and, by adhering to the contacts, permanently closing the circuit when the temperature falls again after a rise.

In Fig. 2 there is in addition to the pair of contacts $a$ $a'$ a similar pair of platinum-wire contacts $b$ $b'$, sealed into and entering the stem between the main bulb $d$ and the mercury column at a point or points only reached by the latter at a temperature at which the low-temperature alarm is to be given. The thermometric fluid contained in this part of the stem and the bulb $d$ is creosote or a heavy hydrocarbon, prepared as herein described, by which the contacts $b\ b'$ are lubricated and preserved from injurious action by the mercury. These contacts are connected to the terminals $p'\ p^2$ of a circuit containing a bell or other alarm or indicator by which warning of a fall of temperature will be given.

As the contacts $b\ b'$ are not required for the purposes of the fire-alarm shown in Fig. 1, the thermometric fluid in $d$ might in that case be mercury; but having regard to the large size of the bore used when the contacts are placed opposite one another (namely, a diameter of about two millimeters) mercury would not usually be employed as the thermometric fluid even for a fire-alarm in consequence of the large size of the bulb which would be required.

For the purposes of this thermostatic circuit-closer wood-creosote is maintained at a uniform temperature of about 300° Fahrenheit, in order to volatilize and eliminate the lighter hydrocarbons, the fatty matters which collect at the surface being skimmed off from time to time, and this treatment being continued until the creosote acquires a boiling-point of about 400° Fahrenheit and a specific gravity of about 1.07 under normal atmospheric conditions.

I claim—

A thermostatic electric-circuit closer, consisting of a thermometer containing a mercurial column, two platinum wires forming the terminal contacts of the circuit and both entering the thermometer-bore at such a point that neither is in contact with the mercury column at normal temperatures, and an insulating fluid contained in the bore between the mercury and the said contacts, said insulating fluid consisting of creosote free of fatty matter and having a boiling-point of about 400° Fahrenheit, substantially as described.

RICHARD PEARSON.

In presence of—
C. G. CLARK,
T. W. KENNARD.